May 19, 1970      L. W. HALLANGER      3,512,493

ADJUSTABLE BUOYANCY LIFT DEVICE

Filed April 23, 1968      2 Sheets-Sheet 1

INVENTOR.
LAWRENCE W. HALLANGER
BY
ERVIN F. JOHNSTON
ATTORNEY

May 19, 1970     L. W. HALLANGER     3,512,493

ADJUSTABLE BUOYANCY LIFT DEVICE

Filed April 23, 1968     2 Sheets-Sheet 2 he United States Patent Office 3,512,493
Patented May 19, 1970

3,512,493
ADJUSTABLE BUOYANCY LIFT DEVICE
Lawrence William Hallanger, Oxnard, Calif., assignor to the United States of America, as represented by the Secretary of the Navy
Filed Apr. 23, 1968, Ser. No. 723,492
Int. Cl. B63c 7/08
U.S. Cl. 114—53         7 Claims

ABSTRACT OF THE DISCLOSURE

The present invention is an adjustable buoyancy device for lifting objects in water. The lift device includes a hollow container which at its bottom end is communicable with the outside water environment. Provision is made to open the container to a gas pressure source so that water within the container can be displaced therefrom and means are provided to open the container to selected water pressures so that the amount of water therein and accordingly the buoyancy thereof can be varied for lifting purposes.

---

The invention described herein may be manufactured and used by or for the Government of the United States of America for governmental purposes without the payment of any royalties thereon or therefor.

Man's increasing quest in the sea has resulted in extensive studies of subsurface ocean currents, temperature, and salinity as well as the effects of the ocean depths on man, materials, and various structures. In these studies test devices are continuously placed and retrieved from the ocean bottom, thus requiring much time to be spent in material handling. The problems of material handling can become quite acute when attempts are made to lift test devices by a support ship which is rolling and pitching with the sea. It can be easily visualized that a winch operated from the ship will subject a lifting cable to periodic strains and slackening as the ship undergoes its various movements. Many test devices are somewhat delicate and it is most desirable that they descend and ascend within the ocean with a minimum of erratic movement.

One method which is commonly used in the oceanographic field for retrieving test instruments from the bottom of the ocean has been a diver operated bell or hollow container. The hollow container is filled with water upon its entry into the ocean sufficiently to cause descent to the area of the test device; the diver then attaches the hollow container to the test device and discharges a sufficient amount of water therefrom to make the combination of the container and the test device slightly buoyant. The test device will then commence to ascend toward the surface with increasing rapidity due to the progressive expansion of the gas within the container. The expansion of the gas is so rapid that in many instances the ascent of the test device will get out of the control of the diver unless the gas is appropriately vented during ascent. One means for venting this gas has been by a lanyard controlled valve which is connected to the upper portion of the container. Unfortunately this method does not allow for a presetting of a desired maximum buoyancy and is entirely dependent upon the ability of the diver.

It has become highly desirable to provide a buoyant lift device which can be easily adjusted and set for a maximum lifting force on submerged instruments which must be retrieved from the ocean. The present invention has provided such a lift device by a hollow container which has means for opening the container to selected water pressures along its length so that the amount of water therein and accordingly the buoyancy of the container can be varied at the will of the diver. In this manner the diver has exacting control of the overall buoyancy of the lifting device and the payload to be retrieved and the maximum overall buoyancy can be present thus obviating the problem of expanding gas within the container and uncontrollable ascent of payload to be retrieved.

An object of the present invention is to overcome the aforementioned problems of the prior art buoyancy lift devices.

Another object is to provide a buoyancy lift device which can be easily controlled by a diver during descent or ascent within water.

A further object is to provide an adjustable buoyancy lift device which after attachment to a submerged payload can be easily preset for an overall positive buoyancy to obviate the problem of uncontrollable ascent.

Other objects, advantages and novel features of the invention will become apparent from the following detailed description of the invention when considered in conjunction with the accompanying drawings wherein.

Figure 1:
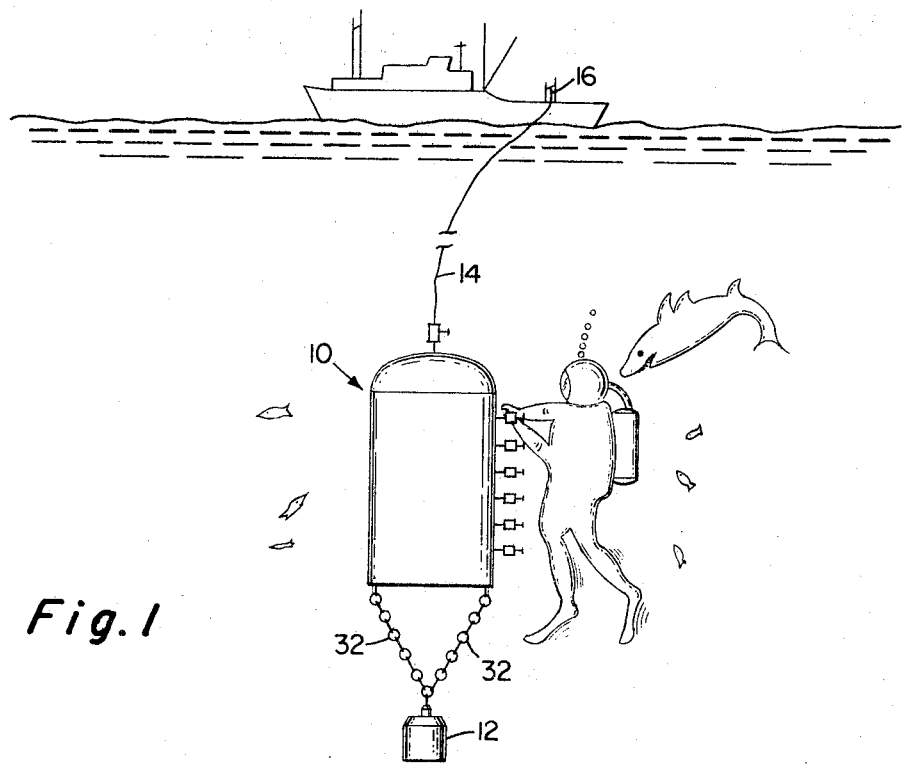
FIG. 1 is a perspective view of the lift device in the process of lifting a payload from the ocean bottom.

Referring now to the drawings wherein like or similar parts are designated by the same reference numerals, there is shown in FIG. 1 an adjustable buoyancy lift device 10 which is in the process of lifting a payload 12 from the ocean bottom. An air hose 14 extends between the lift device and an air or other gaseous pressure source 16 located aboard a support ship. A diver is shown attending the lift device to ensure a gradual ascent of the payload so that damage will not occur thereto.

Figure 2:
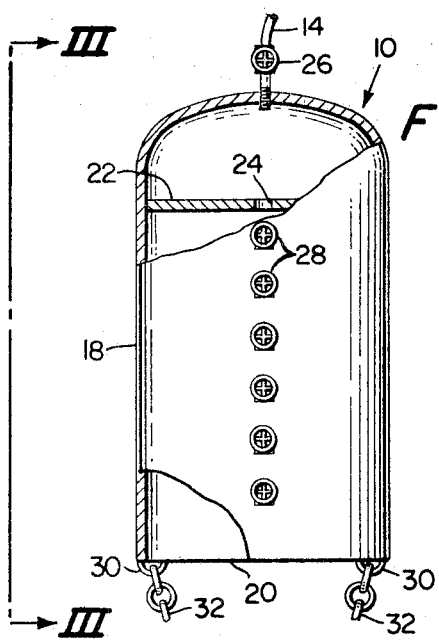
FIG. 2 is a side view of one embodiment of the adjustable buoyancy lift device.
Figure 3:
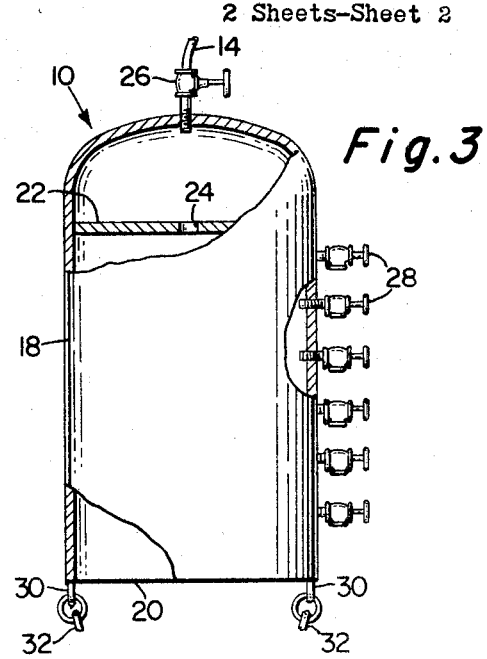
FIG. 3 is a view taken along plane III—III of FIG. 2.

The lift device 10 of FIG. 1 is shown in enlarged form in FIGS. 2 and 3. This lift device includes a container 18 which has a top and a bottom with a bottom portion of the container being communicable with the outside water environment. In the embodiment of FIGS. 2 and 3 the container is in communication with the outside water environment through an open bottom end 20. The container may take various shapes, however, it has been found desirable to utilize a generally cylindrical shape with a dome shaped top as shown in FIGS. 2 and 3. structural integrity of the container may be shown by a transverse plate 22 mounted interiorly in its upper portion with a central opening 24 for interior communications purposes.

The amount of water within the container 18 will determine its buoyancy and accordingly the lift device's descent and ascent within the water. During the descent the container 18 is filled with sufficient water to establish a negative buoyancy. In order to enable ascent of the lift device and its payload this water must be sufficiently displaced by a gas to establish a positive buoyancy. This is accomplished by introducing a gas such as air through the hose 14 which receives its air pressure from the pressure source 16 aboard the support ship. The control of this displacement may be accomplished by any suitable means such as bleed-down, hand-operated valve 26 which may be threaded at one end into the top of the container 18 and receives at its other end the bottom end of the hose 14. In this manner when the diver opens the valve 26 air is introduced into the container 18 and water therein is displaced through the open bottom 20 to increase the buoyancy.

It should be noted that when the lift device is in a submerged condition and the diver has established a slight positive buoyancy through the use of the bleed down valve 26 that, upon ascent of the lift device, the air or gas within the container 18 will progressively expand due to the decreasing ocean pressure. This causes a rapid increase in buoyancy and uncontrollable ascent of the lift device and its payload. This problem has been overcome by providing the container 18 with a means for opening the container to selected water pressure along its length so that the amount of water therein and accordingly the buoyancy thereof can be varied to a desired preset positive buoyancy. In the embodiment of FIGS. 2 and 3 this has been accomplished by a plurality of hand operated on-off valves 28 which may be threaded into the side of the container at spaced locations between its top and bottom. To provide a convenience of control for the attendant diver the valves are preferably aligned in a row along the length of the container 18 as shown in FIGS. 2 and 3. Further, the plurality of valves 28 preferably extend along the majority of the length of the container 18 so that the lift device 10 is usable for retrieving payloads of many various weights. The life device may be connected to the submerged payload by any suitable means such as a pair of eye hooks 30, connected at the bottom end of the container 18, and chains 32 which extend between the eye hooks 30 and the payload.

For descent purposes it is desirable that the chains 32 be of a sufficient weight to provide the lift devices with a positive metacentric height so that it will remain in an upright position.

In the operation of the embodiment, shown in FIGS. 2 and 3, the lift device 10 is first placed in the water by the support ship and is filled with sufficient water to make it slightly negative buoyant. It should be noted that the descent will progressively increase in speed unless the buoyancy is properly controlled due to the increase in ocean pressure and the corresponding decrease in the gas volume of the container 18. With the present invention the descent can be easily controlled by opening the valve 28 which is located immediately below the water line within the container 18 when the lift device is first placed in the water. Accordingly, during descent air pressure can be introduced into the container 18 through the valve 26 to overcome the ocean pressures and maintain the air volume within the container 18 substantially constant. Should this air pressure overcome the ocean pressure more than what is desired the air will be vented through the previously opened valve 28 so that the positive buoyancy of the lift device is preset at the level of the opened valve.

Upon reaching the ocean bottom the diver will close the bleed down valve 26, leave the previously opened valve 28 open and open all valves 28 therebelow, and then attach the chains 32 to the submerged payload which must be retrieved from the ocean bottom. The bleed down valve 26 is then opened to discharge additional water within the container 18 to overcome the weight of the payload. The air introduced into the container 18 will first bleed out through the originally opened valve 28 and if sufficient positive buoyancy has not been established this valve is then closed by the diver. The air pressure then continues to displace more water between this valve just closed and the next valve therebelow. If positive buoyancy has not been established between these valves the air will eventually commence to bleed through the lower valve 28 and it must also be closed by the diver. This process is continued until positive buoyancy is established. After positive buoyancy is established the valve 28 next below the open valves 28 is opened. This opened valve will control the rate of ascent of the lift device and the payload by venting the expanding air due to the progressive decrease in ocean pressure. The diver will be able to see or hear this venting of the air and if desired he may obtain even a finer control of the ascent by operating the bleed down valve 26 to establish a water level between the open and closed valves.

Figure 4:
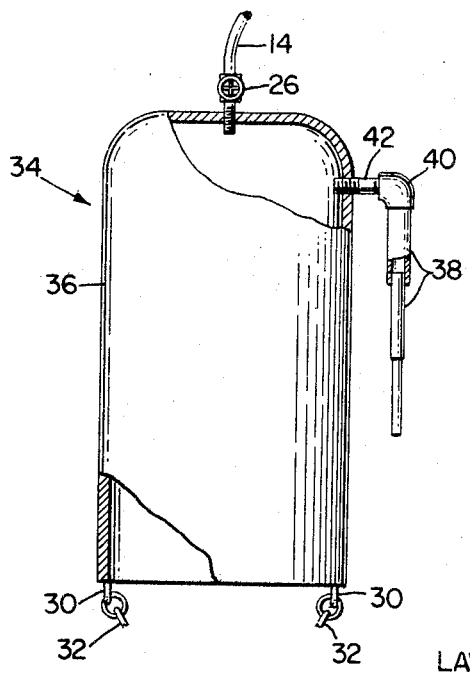
FIG. 4 is a side view of another embodiment of the adjustable buoyancy lift device.

Another embodiment 34 of the lift device is shown in FIG. 4. This lift device may include a generally cylindrical container 36 which is closed at its top and open at its bottom. The top of the container is provided with the bleed down valve 26 and the bottom thereof is provided with the chains 32 as previously described for the embodiment of FIGS. 2 and 3. The means for opening the container 36 to selected water pressures along its length has been acomplished by a telescoping tube 38 which extends along the length of the container 36 and which is connected into the container 36 at its upper end by an elbow 40 and nipple 42. The sections of the telescoping tube 38 may be limited in their downward movement by a complementary pin and slot arrangement (not shown) for each pair of sections. The sections of the telescoping tube 38 may be made of plastic for lightness and with appropriate diametric tolerances so that the tube sections snugly slide with respect to one another. The operation of this embodiment is similar to the previously described embodiment except that the tube sections are slid to the appropriate length to establish the buoyancy desired in lieu of operating the plurality of valves 28. The embodiment of FIG. 4 has an unique advantage over the previous embodiment in that a very fine adjustment of the buoyancy of the lift device can be obtained thereby obviating the need for operating the bleed down valve 26 for fine control during ascent of the lift device and the payload.

Figure 5:
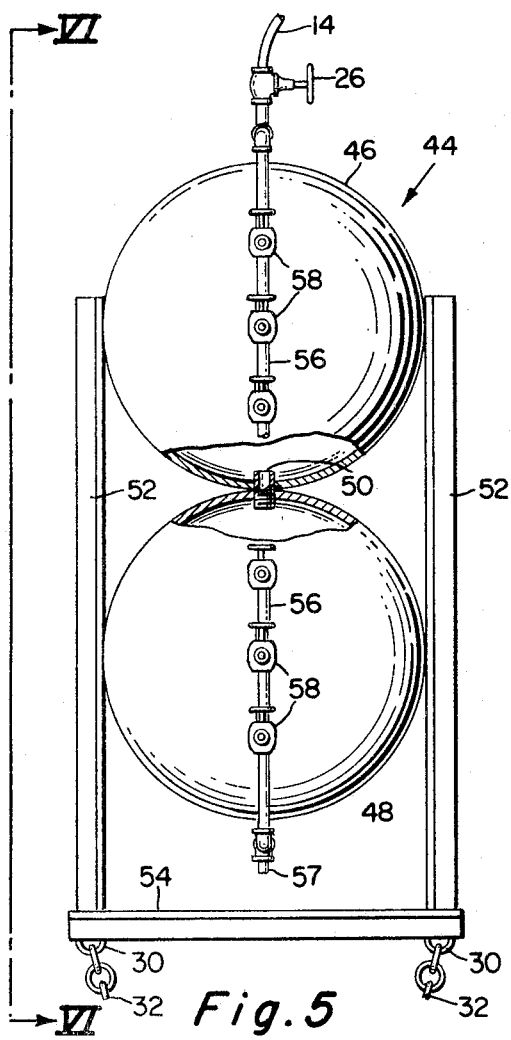
FIG. 5 is a side view of still another embodiment of the adjustable buoyancy lift device.
Figure 6:
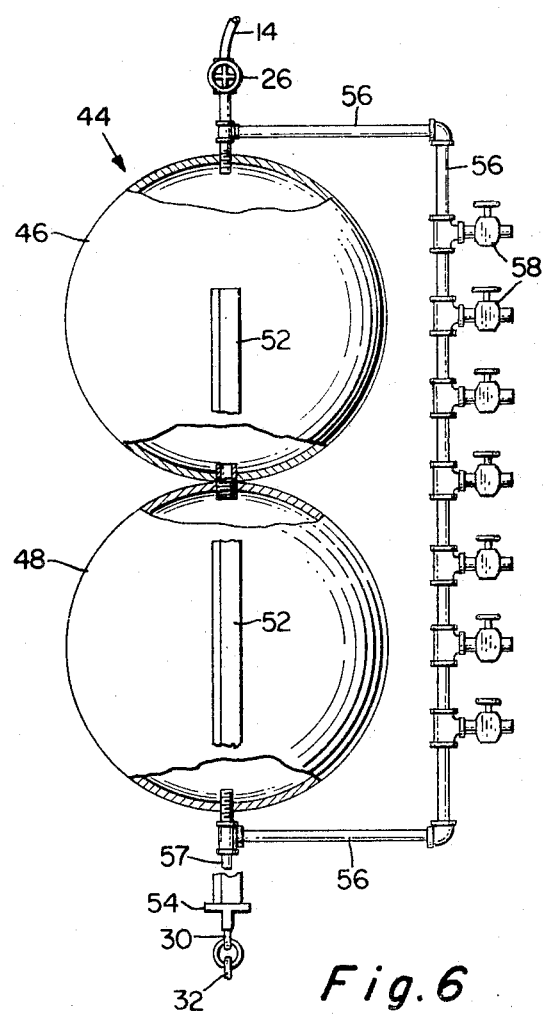
FIG. 6 is a view taken along plane VI—VI of FIG. 5.

FIGS. 5 and 6 illustrate still another embodiment 44 of the present invention. This lift device 44 may comprise a pair of hollow containers such as top and bottom hollow spheres 46 and 48 which may be interconnected by a nipple 50 which enables communication therebetween. A frame comprising a pair of vertical angle irons 52 and a horizontally connected T beam 54 may be utilized for transferring the load between the payloads and the hollow spheres 46 and 48. The angle irons 52 may be connected to the spheres by welding each angle iron tangentially to each sphere. It is desirable that this frame and the chains 32 establish a positive metacentric height for the overall lift device 44.

As shown in FIG. 6, the bleed down valve 26 may be connected to the top of the upper hollow sphere 46. The means for opening the hollow spheres to selected water pressures along their lengths may comprise a generally U-shaped tube 56 which is connected at one end to the top of the upper sphere 46 between the bleed down valve 26 and this upper sphere, and at the other end to the bottom of the lower sphere 48 and is open to the ocean environment through a small pipe 57. Accordingly, in this manner the top of the upper sphere 46 is in communication with the bottom of the lower sphere 48 and both spheres are open at the bottom of the bottom sphere 48 to the ocean environment. A series of on-off hand operated valves 58 are provided at spaced intervals along the vertical length of the tube 56 so as to selectively open and close this tube to the outside water pressure environment. For practical operation of this lift device these series of valves 58 should extend over a majority of the length between the top of the upper sphere 46 and the bottom of the lower sphere 48. The operation of this lift device 44 will be identical to that as previously described for the embodiment 10, shown in FIGS. 2 and 3.

If desired the valves of the embodiments of FIGS. 2 and 5 could be adapted for remote operation from the support ship. Further, if desired a high pressure gas container could be mounted at the top of the bleed down valve 26, thus obviating the requirement of the hose 14 connected between the lift device and the support ship.

It is now readily apparent that the present invention provides a very simple lift device which can be easily adjusted for buoyancy to gradually lift a payload from the ocean bottom. The unique control arrangement enables a diver to preset the positive buoyancy of the lift device and the payload so that uncontrollable ascent will not destroy the payload which is being retrieved.

Obviously many modifications and variations of the present invention are possible in the light of the above teachings. It is therefore to be understood that within the scope of the appended claims the invention may be practiced otherwise than as specifically described.

I claim:
1. An adjustable buoyancy device for lifting objects in water comprising:
   a hollow vertically-elongate container having a top and a bottom portion;
   said bottom portion of said container being in open communication with the outside water environment;
   valve-controlled inlet means disposed in said top portion and adapted for communicating the container interior with a gas pressure source;
   liquid level control outlet means carried by said container operative along a major portion of its vertical length, said liquid level control means being operable at selected levels along said vertical length for communicating said container interior with the water environment at the selected water pressure of said level;
   whereby said level can be selected and said interior pressurized by said source to force interior water out through the operated liquid level control means and to introduce pressurized gas into said interior in sufficient volume to provide a desired buoyancy force;
   said gas pressure and said liquid level-control means being so arranged and selected that buoyancy variations due to expansions of said gas volume can be counteracted by escape of the gas through said liquid level control means; and
   means for connecting the container to a submerged object.
2. A lift device as claimed in claim 1 wherein:
   said means for communicating the container to selected water pressures includes a plurality of valves connected to the container at spaced locations between the top and bottom of the container.
3. A lift device as claimed in claim 2 wherein:
   the plurality of valves are aligned in a row along the length of container.
4. A life device as claimed in claim 1 wherein:
   said means for communicating the container to selected water pressures includes a tube which extends along the length of the container; and
   said tube has a plurality of sections which telescope within one another.
5. A lift device as claimed in claim 1 wherein:
   said liquid level control means includes:
      a tube connected between top and bottom portions of the container; and
      a plurality of valves connected to the tube along its length for opening the tube at selected locations to the outside water environment.
6. A lift device as claimed in claim 5 wherein:
   said tube is connected between the bottom of the container and said valve controlled inlet.
7. A lift device as claimed in claim 6 wherein:
   the container includes a pair of hollow spheres which are interconnected and communicable with one another; and
   the means for connecting the container to a submerged object includes a frame which is mounted to said spheres.

References Cited

UNITED STATES PATENTS

| 1,339,717 | 5/1920 | Sanges | 114—53 |
| 1,367,250 | 2/1921 | Gray | 114—53 |
| 1,740,231 | 12/1929 | Ellsberg | 114—53 |
| 3,030,905 | 4/1962 | Metzger | 114—53 RX |

ANDREW H. FARRELL, Primary Examiner